(12) United States Patent
Hu (10) Patent No.: US 10,645,584 B2
(45) Date of Patent: *May 5, 2020

(54) WIRELESS COMMUNICATION OF INFORMATION FROM ACCESS CONTROL DEVICE TO MOBILE COMMUNICATIONS DEVICE

(71) Applicant: Avigilon Corporation, Vancouver (CA)

(72) Inventor: Jonathan Hu, Surrey (CA)

(73) Assignee: Avigilon Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,135

(22) Filed: Sep. 26, 2018

(65) Prior Publication Data

US 2019/0082324 A1    Mar. 14, 2019

Related U.S. Application Data

(63) Continuation of application No. 15/840,943, filed on Dec. 13, 2017, now Pat. No. 10,111,101, which is a (Continued)

(51) Int. Cl.
*H04W 40/24* (2009.01)
*H04W 12/08* (2009.01)
(Continued)

(52) U.S. Cl.
CPC ............. *H04W 12/08* (2013.01); *H04W 4/33* (2018.02); *H04W 4/80* (2018.02); *H04W 40/244* (2013.01); *H04L 41/22* (2013.01); *H04W 88/02* (2013.01)

(58) Field of Classification Search
CPC ................................ H04W 12/08; H04W 4/33
See application file for complete search history.

(56) References Cited

U.S. PATENT DOCUMENTS 9,396,599 B1   7/2016  Malhotra
2010/0109864 A1  5/2010  Haartsen et al.
(Continued)

OTHER PUBLICATIONS

Thota et al., "Lighting the way with BLE beacons", dated Jul. 14, 2015; Google Developers Blog: Lighting the way with BLE beacons; retrieved from the internet on Sep. 19, 2016; 7 pages.
(Continued)

*Primary Examiner* — Tuan H Nguyen
(74) *Attorney, Agent, or Firm* — Daniel Hammond (57) ABSTRACT

Wireless communication of information from an access control device to a mobile communications device is disclosed. The mobile communications device is capable of communicating with at least two transmitters. The at least two transmitters include i) a first transmitter located at a first access controlled door that transmits first BLE beacons; and a ii) second transmitter located at a second access controlled door that transmits second BLE beacons. The mobile communications device includes a Bluetooth communication module that is configured to receive a plurality of BLE beacons, including the first BLE beacons and the second BLE beacons, from the at least two transmitters at different locations on a same floor within a premises. The mobile communications device also includes a microprocessor that is configured to execute instructions to determine a location of the mobile communications device based at least in part on signal properties of the first and second BLE beacons, beacon-identifying information contained in the first and second BLE beacons, and known locations of the first and second access controlled doors. The mobile communications device also includes a display that is configured to output text or graphics to inform a device user of the location of the mobile communications device relative to at least the first and second access controlled doors.

13 Claims, 7 Drawing Sheets

Related U.S. Application Data continuation of application No. 15/348,715, filed on Nov. 10, 2016, now Pat. No. 9,877,199.

(51) Int. Cl.
  *H04W 4/80* (2018.01)
  *H04W 4/33* (2018.01)
  *H04W 88/02* (2009.01)
  *H04L 12/24* (2006.01)

(56) References Cited

U.S. PATENT DOCUMENTS

| | | |
|---|---|---|
| 2011/0128145 A1 | 6/2011 | Todd et al. |
| 2014/0087758 A1 | 3/2014 | Maor |
| 2015/0312696 A1* | 10/2015 | Ribbich .................. H04W 4/33 455/418 |
| 2016/0011751 A1* | 1/2016 | Moses .................... G08B 25/14 715/769 |
| 2016/0189453 A1 | 6/2016 | Johnson et al. |
| 2016/0295358 A1 | 10/2016 | Cariss et al. |
| 2017/0094466 A1 | 3/2017 | Bjorkengren |

OTHER PUBLICATIONS

"Exploring the Physical Web with Chrome for iOS", dated Jul. 22, 2015; Chromium Bloc: Exploring the Physical Web with Chrome for iOS; retrieved from the internet on Sep. 19, 2016; 7 pages.
International Search Report and Written Opinion dated Jan. 16, 2018, issued by the Canadian Intellectual Property Office in connection with PCT Application No. PCT/CA2017/051288, filed Oct. 30, 2017.

* cited by examiner

NEARBY DOORS

SELECT A DOOR:

| DOOR | DISTANCE |
|---|---|
| DOOR XYZ | 1.0 m |
| DOOR XYY | 1.2 m |
| DOOR XYX | 1.4 m |

WIRELESS COMMUNICATION OF INFORMATION FROM ACCESS CONTROL DEVICE TO MOBILE COMMUNICATIONS DEVICE

CROSS-REFERENCE TO RELATED APPLICATIONS

This application is a continuation of U.S. application Ser. No. 15/840,943 (now issued as U.S. Pat. No. 10,111,101) entitled WIRELESS COMMUNICATION OF INFORMATION FROM ACCESS CONTROL DEVICE TO MOBILE COMMUNICATIONS DEVICE and filed Dec. 13, 2017, which is a continuation of U.S. application Ser. No. 15/348,715 (now issued as U.S. Pat. No. 9,877,199) entitled WIRELESS COMMUNICATION OF INFORMATION FROM ACCESS CONTROL DEVICE TO MOBILE COMMUNICATIONS DEVICE and filed on Nov. 10, 2016, the entireties of all of which are hereby incorporated by reference herein.

FIELD

The present subject-matter relates to access control devices and systems and, in particular, to wireless communication of information from an access control device to a mobile communications device.

BACKGROUND

An electronic access control system grants access based on the credential presented. When access is granted, the door is unlocked for a predetermined time and the transaction is recorded. When access is refused, the door remains locked and the attempted access is recorded. The access control system will also monitor the door and alarm if the door is forced open or held open too long after being unlocked.

Electronic locking/unlocking mechanisms on access controlled doors have traditionally been able to communicate with (and also receive power from) other parts of the electronic access control system (e.g. control panel) via wires. With the advancement of wireless communications, more and more electronic locking/unlocking mechanisms are now capable of communicating wirelessly with other parts of the electronic access control system.

SUMMARY

According to one example embodiment, there is provided an access control system. The access control system includes a first electronic lock mechanism containing a first transmitter for transmitting first BLE beacons. The first electronic lock mechanism is configured to be installed on a first access controlled door within a premises. The access control system also includes a second electronic lock mechanism containing a second transmitter for transmitting second BLE beacons. The second electronic lock mechanism is configured to be installed apart from the first electronic lock mechanism on a second access controlled door within the premises. The access control system also includes a mobile communications device. The mobile communications device includes a Bluetooth™ communication module that is configured to receive the first and second BLE beacons. The mobile communications device also includes a microprocessor that is configured to execute instructions to determine a location of the mobile communications device based at least in part on signal properties of the first and second BLE beacons, beacon-identifying information contained in the first and second BLE beacons, and known locations of the first and second access controlled doors. The mobile communications device also includes a display that is configured to output text or graphics to inform a device user of the location of the mobile communications device relative to at least the first and second access controlled doors.

According to another example embodiment, there is provided a method carried out on a mobile communications device. The method includes receiving a plurality of BLE beacons, including first BLE beacons and second BLE beacons, from at least two transmitters at different locations on a same floor within a premises. The at least two transmitters include i) a first transmitter located at a first access controlled door that transmits the first BLE beacons; and ii) a second transmitter located at a second access controlled door that transmits the second BLE beacons. The method also includes determining a location of the mobile communications device based at least in part on signal properties of the first and second BLE beacons, beacon-identifying information contained in the first and second BLE beacons, and known locations of the first and second access controlled doors. The method also includes outputting, onto a display of the mobile communications device, text or graphics that informs a device user of the location of the mobile communications device relative to at least the first and second access controlled doors.

According to another example embodiment, there is provided a mobile communications device. The mobile communications device is capable of communicating with at least two transmitters. The at least two transmitters include i) a first transmitter located at a first access controlled door that transmits first BLE beacons; and a ii) second transmitter located at a second access controlled door that transmits second BLE beacons. The mobile communications device includes a Bluetooth™ communication module that is configured to receive a plurality of BLE beacons, including the first BLE beacons and the second BLE beacons, from the at least two transmitters at different locations on a same floor within a premises. The mobile communications device also includes a microprocessor that is configured to execute instructions to determine a location of the mobile communications device based at least in part on signal properties of the first and second BLE beacons, beacon-identifying information contained in the first and second BLE beacons, and known locations of the first and second access controlled doors. The mobile communications device also includes a display that is configured to output text or graphics to inform a device user of the location of the mobile communications device relative to at least the first and second access controlled doors.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects. Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to embodiments of the invention. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a suitable form of programmable data processing apparatus to produce a machine, such that the instructions, which executed via the processor of the programmable data processing apparatus, create means for implementing the functions/acts specified in the flowchart and/or block diagram block or blocks.

These computer program instructions may also be stored in a computer-readable memory that can direct the programmable data processing apparatus to function in a particular manner, such that the instructions stored in the computer-readable memory produce an article of manufacture including instructions which implement the function/act specified in the flowchart and/or block diagram block or blocks.

Figure 1:
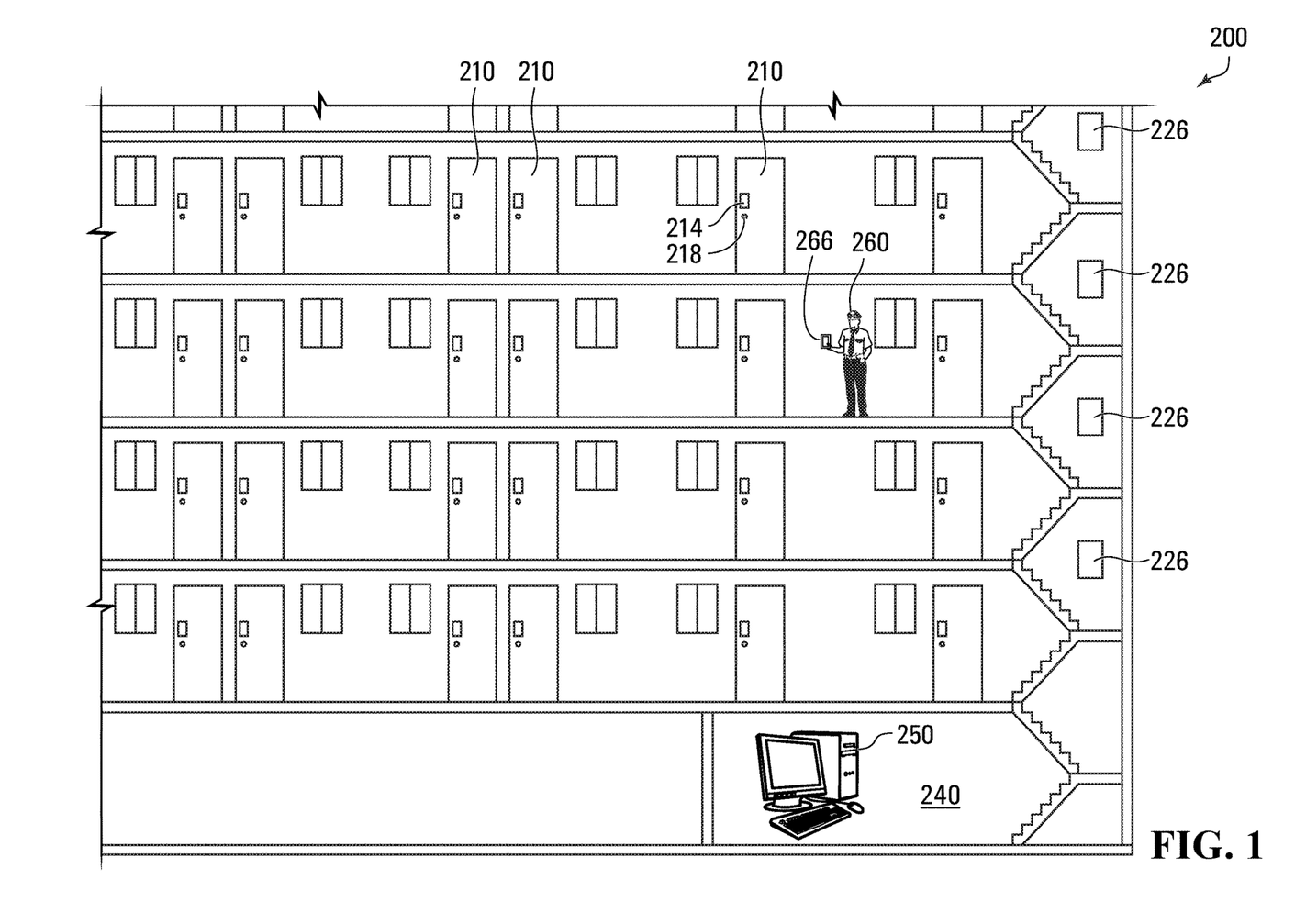
FIG. 1 shows a pictorial diagram of a premises within which an access control system is installed in accordance with some example embodiments.

Reference is now made to FIG. 1 which shows a pictorial diagram of a premises 200. The premises 200 may include one or more buildings such as for example, an agricultural building, an office/commercial building, an apartment/residential building, an educational building, a government building, an industrial building, a military building, a parking structure, a storage building, a religious building, a public transport building, a data center building, a power station/plant, or any combination of these buildings. Within the premises 200 is a plurality of access controlled doors 210. Although not necessarily required in the case of a door opened by a pushing motion, each of the illustrated access controlled doors 210 includes a door handle 218. Also, each of the illustrated access controlled doors 210 includes an electronic locking/unlocking mechanism 214 that includes a card reader and/or keypad lock. In some examples the electronic locking/unlocking mechanism 214 and the door handle 218 are integrated together, such as in the case of an electronic mortise lock which requires a pocket cut into the door into which the electronic lock can be fitted. In other examples the electronic locking/unlocking mechanism 214 may take the form of an electronic cylindrical lock, which is a lock constructed with a cylinder that operates by means of an electric current. It still other examples, the electronic locking/unlocking mechanism 214 may be some other type of lock such as, for instance, an electronic exit trim lock.

In accordance with at least some example, the electronic locking/unlocking mechanism 214 is configured to emit Bluetooth™ Low Energy (BLE) beacons which are one way (and therefore do not require a paired connection). By design, BLE beacons are meant to be discoverable by any nearby mobile communications devices that are Bluetooth Smart™. This discoverability is via an identifier which is a public signal. In terms of privacy and security, the BLE beacons in accordance with Eddystone™ have built in a feature called Ephemeral Identifiers (EIDs) which change frequently, and allow only authorized clients to decode them.

Still with reference to FIG. 1, there are a plurality of control panels 226 within the illustrated premises 200. Each of the control panels 226 controls a set of electronic locking/unlocking mechanisms for a respective set of the access controlled doors 210. For example, each of the control panels 226 can control proximate electronic locking/unlocking mechanisms such as for instance, some or all of those electronic locking/unlocking mechanisms on the same floor as the respective control panel.

Also within the illustrated premises 200, there is a security guard room 240. In the illustrated example embodiment, the security guard room 240 is in the basement of the premises 200; however the security guard room 240 need not be subterranean and can be located effectively anywhere within the premises 200. Within the security guard room 240 is a computer terminal 250. In some example embodiments, the computer terminal 250 is a personal computer system; however in other example embodiments the computer terminal 250 is a laptop computer, a smart television, or some other suitable device. The computer terminal 250 communicates with a server system, which may comprise a single physical machine or multiple physical machines. The server system may be located remotely from the illustrated premises 200. The server system may also be located local to the illustrated premises 200. It will be understood that the server system need not be contained within a single chassis, nor will it necessarily be the case that there is a single location for the server system. As will be appreciated by those skilled in the art, at least some of the functionality of the server system can be implemented within the computer terminal 250 rather than within the server system. Also, at least some of the functionality of the server system can be implemented within the cloud. While the server system is not shown in FIG. 1, a suitable server system 410 in accordance with some example embodiments will be shown and described later in connection with FIG. 3.

The computer terminal 250 communicates with the server system through one or more networks. These networks can include the Internet and/or one or more other public/private networks coupled together by network switches or other communication elements. The network(s) could be of the form of, for example, client-server networks, peer-to-peer networks, etc. In at least one example embodiment, the computer terminal 250 and the server system are within the same Local Area Network (LAN). Data connections between the computer terminal 250 and the server system can be any number of known arrangements for accessing a data communications network, such as, for example, Point-to-Point Protocol (PPP) over a wired or wireless connection, Integrated Services Digital Network (ISDN), dedicated lease line service, broadband access (for instance, cable, line-of-sight wireless, etc.), Digital Subscriber Line (DSL), Asynchronous Transfer Mode (ATM), Frame Relay, radio frequency (RF) links, WiFi™, WiMAX™, or other any suitable combination of two or more of these known arrangements. These known arrangements for accessing a data communications network may apply in a similar manner to the following other data connections between communication-enabled entities herein described: between the server system 410 (FIG. 3) and the panels 226; between the panels 226 and respective electronic locking/unlocking mechanisms 214; and between the mobile communications device 266 and the server system 410.

In the illustrated example embodiment, a security guard 260 is shown on patrol on the third floor of the premises 200. The security guard 260 is carrying a mobile communications device 266. In some example embodiments, the mobile communications device 266 is a smart phone; however in other example embodiments the mobile communications device 266 is some other form of handheld device such as, for example, a tablet, a phablet, or a wirelessly enabled personal digital assistant (PDA).

Figure 2:
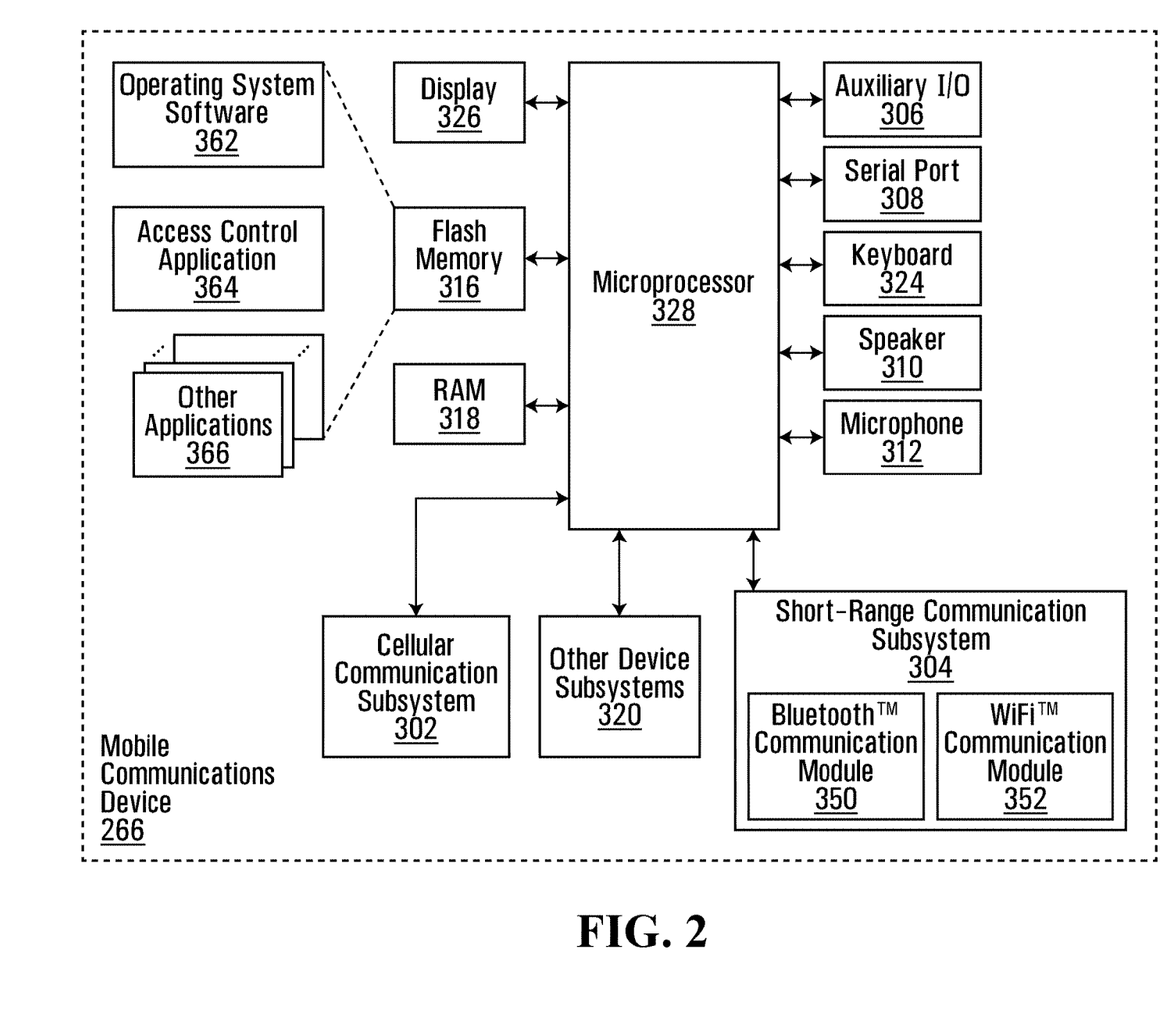
FIG. 2 shows a block diagram of a mobile communications device in accordance with some example embodiments.

FIG. 2 illustrates the mobile communications device 266 that includes a housing [not illustrated], an input device (a keyboard 324) and an output device (a display 326), which may be a full graphic and color, Liquid Crystal Display (LCD). Other types of output devices may alternatively be utilized. A processing device (a microprocessor 328) is shown schematically in FIG. 2 as coupled between the keyboard 324 and the display 326. The microprocessor 328 controls the operation of the display 326, as well as the overall operation of the mobile device 266, in part, responsive to actuation of keys on the keyboard 324 by a user.

The housing for the mobile communications device 266 may be elongated vertically, or may take on other sizes and shapes (including clamshell housing structures). The keyboard 324 may include a mode selection key, or other hardware or software, for switching between text entry and telephony entry. In some examples, the keyboard 324 may not be a keyboard with mechanically actuated keys, but may instead be a virtual keyboard which may be provided as selectable elements on the display 326 where the display 326 is touch-screen.

In addition to the microprocessor 328, other parts of the mobile communications device 266 are shown diagrammatically in FIG. 2. These include: a cellular communication subsystem 302; a short-range communications subsystem 304; a set of auxiliary I/O devices 306, a serial port 308, a speaker 310 and a microphone 312; as well as memory devices including a flash memory 316 and a Random Access Memory (RAM) 318; and various other device subsystems 320. The mobile communications device 266 may be a two-way radio frequency (RF) communication device having voice and data communication capabilities. In addition, the mobile communications device 266 may have the capability to communicate with other computer systems via the Internet.

Operating system software 362 executed by the microprocessor 328 is typically stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the mobile device may also be stored to the RAM 318.

The microprocessor 328, in addition to its operating system functions, enables execution of access control application 364 and other applications 366 on the mobile device 266. The access control application 364 will be discussed in more detail subsequently.

Communication functions, including data and voice communications, are performed through the cellular communication subsystem 302 and through the short-range communications subsystem 304. Both the cellular communication subsystem 302 and the short-range communications subsystem 304 are capable of receiving and transmitting, in respect of their communication functions, via one or more antennas. The specific design and implementation of the cellular communication subsystem 302 is dependent upon the communication network in which the mobile communications device 266 is intended to operate. For example, the cellular communication subsystem 302 of the mobile communications device 266 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 266.

The cellular communication subsystem 302 can process a received signal, such as a text message or web page download, for input to the microprocessor 328. The received signal is then further processed by the microprocessor 328 for output to the display 326, or alternatively to some auxiliary I/O devices 306. A device user may also compose data items, such as e-mail messages, using the keyboard 324 and/or some other auxiliary I/O device 306, such as a touchpad, a rocker switch, a thumb-wheel, or some other type of input device. The composed data items may then be transmitted over a wireless carrier network via the cellular communication subsystem 302.

Overall operation of the mobile communications device 266 in a voice communication mode may be substantially similar to operation in the data communication mode, except that received signals are output to the speaker 310, and signals for transmission are generated by the microphone 312. Alternative voice or audio I/O subsystems, such as a voice message recording subsystem, may also be implemented on the device 266. In addition, the display 326 may also be utilized in voice communication mode, for example, to display the identity of a calling party, the duration of a voice call, or other voice call related information.

The short-range communications subsystem 304 enables communication between the mobile communications device 266 and other proximate systems or devices. For example, the illustrated short-range communications subsystem 304 includes a Bluetooth™ communication module 350 to provide for communication with similarly-enabled systems and devices. As another example, the illustrated short-range communications subsystem 304 also includes a Wi-Fi™ communication module 350 to provide for communication with similarly-enabled systems and devices. As already mentioned, a user of the mobile communications device 266 may compose data items, such as e-mail messages, using the keyboard 324 and/or some other auxiliary I/O device 306, such as a touchpad, a rocker switch, a thumb-wheel, or some other type of input device. As an alternative to transmission over a wireless carrier network, the composed data items may be transmitted over a wireless local area network via the short-range communications subsystem 304. Also, those skilled in the art will appreciate that the mobile communications device 266 may obtain Global Positioning System (GPS) information and data through the cellular communication subsystem 302, the short-range communications subsystem 304 and/or a separate GPS receiver.

Figure 3:
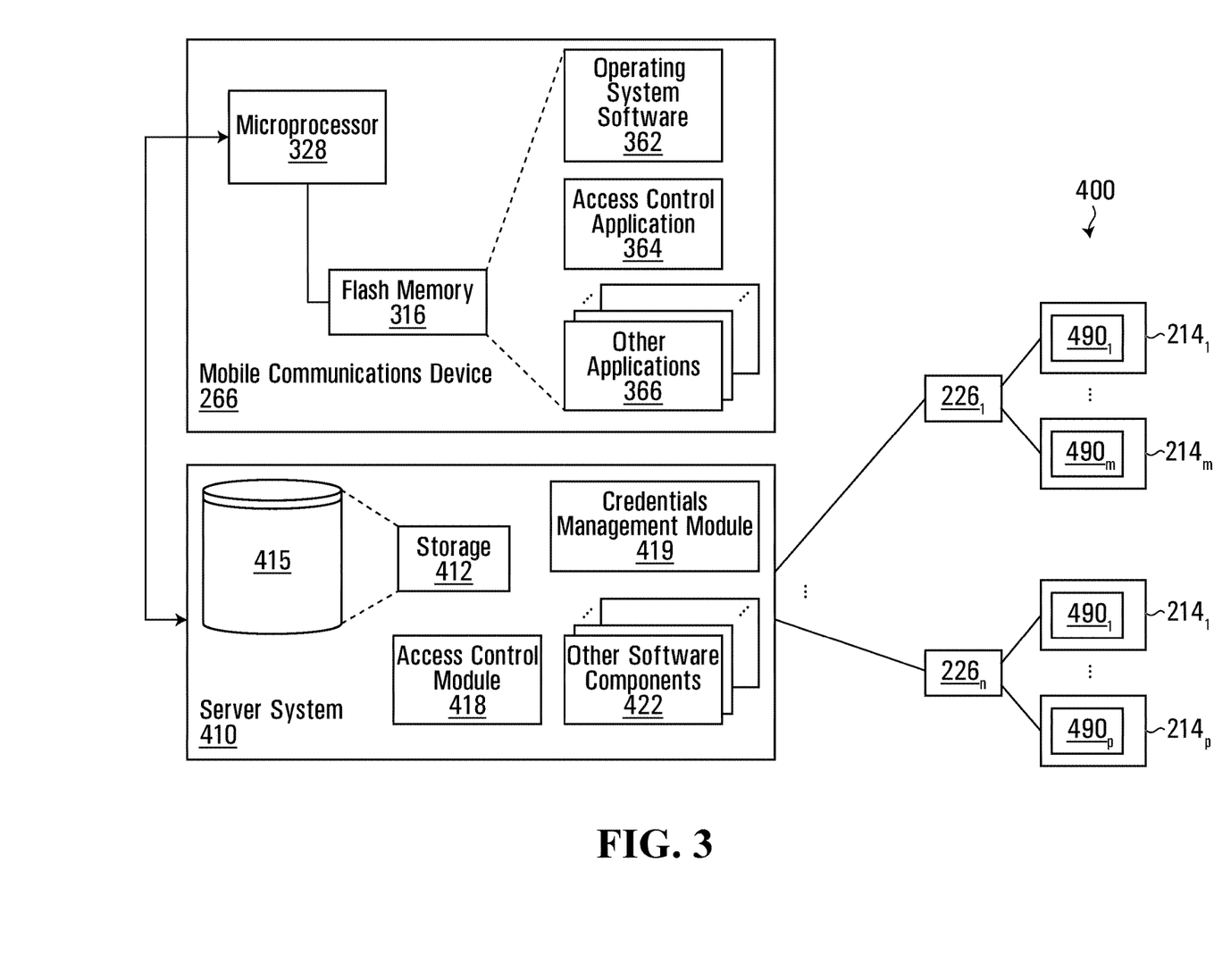
FIG. 3 shows a block diagram of an access control system in accordance with some example embodiments, the illustrated access control system including the mobile communications device of FIG. 2.

Reference will now be made to FIG. 3 which illustrates an access control system 400 in accordance with some example embodiments. For convenience of illustration, not all components of the access control system 400 are shown (for example, the computer terminal 250 shown in FIG. 1 is not shown; however this would be communicatively coupled to the server system 410 in any suitable manner, examples of which were previously non-exhaustively listed and described as "known arrangements"). As previously mentioned in connection with FIG. 2, the access control application 364 can be run on the mobile communications device 266. In connection with the access control application 364, through the use of a suitable communications interface of the mobile communications device 266 the access control module 418 on the server system 410 can be accessed to permit the exchange of data and information (for example, database records) to be retrieved from and stored in data store 415 on the storage 412 of the server system 410.

Besides the access control module 418, the server system 410 includes several software components for carrying out other functions of the server system 410. For example, the server system 410 includes a credentials management module 419. The credentials management module 419 allows for control and management of user privileges within the access control system 400.

The server system 410 also includes a number of other software components 422. These other software components will vary depending on the requirements of the server system 410 within the overall system. As just one example, the other software components 422 might include special test and debugging software, or software to facilitate version updating of modules within the server system 410.

The server system 410 can communicate with any one or more of the control panels $226_1$-$226_n$ via a suitable wired communications path, a suitable wireless communications path, or some combination of both types of paths (i.e. the "known arrangements" for accessing a data communications network). Each of the panels 226 can in turn communicate with respective electronic locking/unlocking mechanisms 214 via suitable wired communications paths, suitable wireless communications paths, or some combination of both types of paths (i.e. the "known arrangements" for accessing a data communications network). In the case of the panel 226 communicating with respective electronic locking/unlocking mechanisms 214 via wireless communications paths there may be no wires in and around the doors and batteries proximate or within respective electronic locking/unlocking mechanisms 214 power these wireless locks. To save power these wireless locks may, after a period of inactivity, enter into a low power mode (for example, a sleep) and stay in this low power mode until prompted to exit the low power mode upon receipt of recognized digital credentials. In accordance with at least one example embodiment, BLE beacons emitted from BLE transmitters 490 in the wireless locks provide information to determine battery health (i.e. whether any batteries in any of the wireless locks are in need of replacement). In some examples each of the BLE transmitters 490 can take the form of a small coin cell device. In some examples where the locks are powered by wires that extend through the door and into the lock, the BLE transmitters 490 can be powered from the same power source that powers the locks.

In some respect BLE beacons can be thought of as enabling a search engine within the physical environment where the BLE beacons are broadcast. Icons or links corresponding to nearby smart objects can be displayed on the beacon-receiving device, and the smart objects can be ranked like search results by some combination of proximity, signal strength, user preferences and browsing history. BLE beacons will be described in more detail in a later part of the present disclosure.

Figure 4:
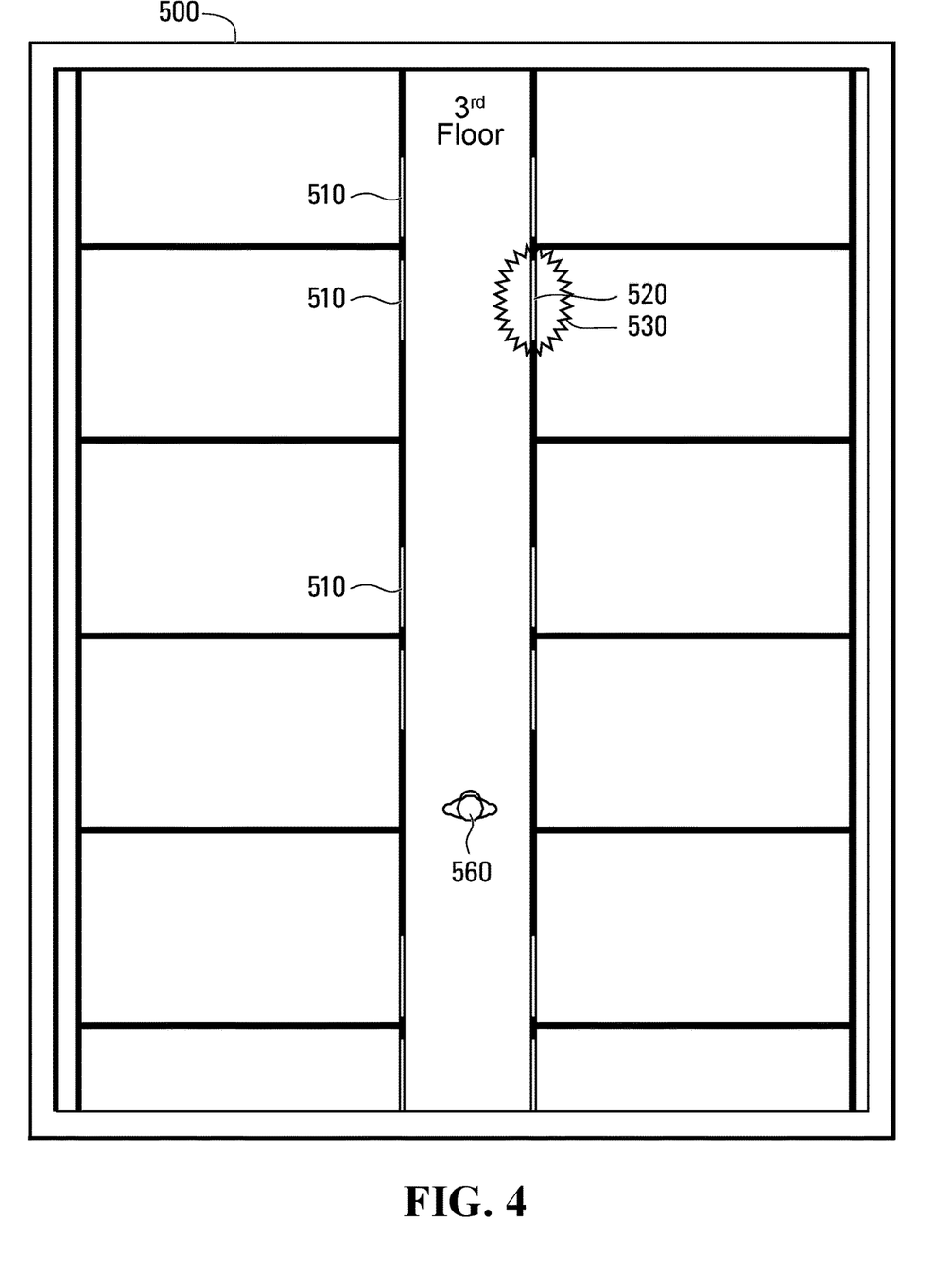
FIG. 4 illustrates an example user interface page for an access control application run on the mobile communications device of FIG. 2.

FIG. 4 illustrates an example user interface page 500 that can be generated when the access control application 364 is run on the mobile communications device 266. As shown on the user interface page 500, various graphic representations of access controlled doors 510 (door representations 510) are showing those doors in a normal status; however one graphic representation of an access controlled door 520 (door representation 520) is showing that door in alert status. Alert status in the illustrated user interface page 500 is shown by a flashing indicator 530; however other indicators are contemplated (such as, for example, special color(s), a pointer appearing beside the graphical representation, gyration of the graphical representation, etc.).

Also shown within the example user interface page 500 is a graphical representation of a security guard 560. In the illustrated example, the graphical representation of the security guard 560 serves to illustrate the position of the security guard on the third floor of the premises. Referring again to FIGS. 1 and 3, BLE beacons emitted from the BLE transmitters 490 at locations of each of the doors 210 (in combination with any GPS or other location information the mobile communications device 266 can obtain itself) are used to allow the mobile communications device 266 carried by the security guard 260 to determine: i) that the floor that the security guard 260 is on is the third floor; and ii) the position of the security guard 260 on the third floor. In particular the GPS location information may by itself be enough to map at least a rough location of the security guard; however sometimes indoors the GPS functionality of the mobile communications device 266 does not function properly because of the line of sight issue and also the issue that buildings have a wide variety of physical barriers and potential interference sources to inhibit transmission of GPS signals within the building. Thus, to confirm (or provide a backup for) the GPS location information, the mobile communications device 266 can calculate and determine position information by using the known positions of the door locks and deriving the security guard location from Received Signal Strength Indication (RSSI) of BLE beacons using techniques understood by those skilled in the art such as, for example, trilateration and weighted averages. Also, it is contemplated that combining different sources of sensor data and information to determine accurate indoor location can extend beyond combining GPS location information and RSSI. In accordance with at least one example embodiment reference information regarding physical characteristics of the premises 200 recorded during installation of the access control system are accessible by the mobile communications device 266 and then data (for example, wall texture data and RF Parametric data) from sensors in the mobile communications device 266 can be used to make location calculations the results of which can be combined with location calculations made through the other methods and techniques to make a confirmed determination of the location of the security guard 260. It is contemplated that some example embodiments will employ other location determination methods as an alternative to or in combination with those already described. For example, US Pat. Publ. 2016/0189453 to Johnson et al. discloses another location determination method some details of which are different from what has already been described. Also, in at least one example embodiment the location of the mobile communications device 266 may be determined by only making calculations using the BLE beacons and the known positions of the door locks.

The position of the security guard 260 is thus determined. Once the above security guard position is determined, it is then provided to the access control application 364 to map the corresponding position of the graphical representation of a security guard 560 on the user interface page 500.

Still with reference to the user interface page 500, the device user (i.e. the security guard 260) can, in some examples, tap or click on any one of the door representations 510 or the door representation 520 and a configuration page for the selected door will be loaded for display as long as that selected door is within Bluetooth™ communications range. Alternatively, door selection can occur in other manners, and one possible example in this regard would be selection via a separate selection page, such as user interface page 600 which is illustrated in FIG. 5.

Figure 5:
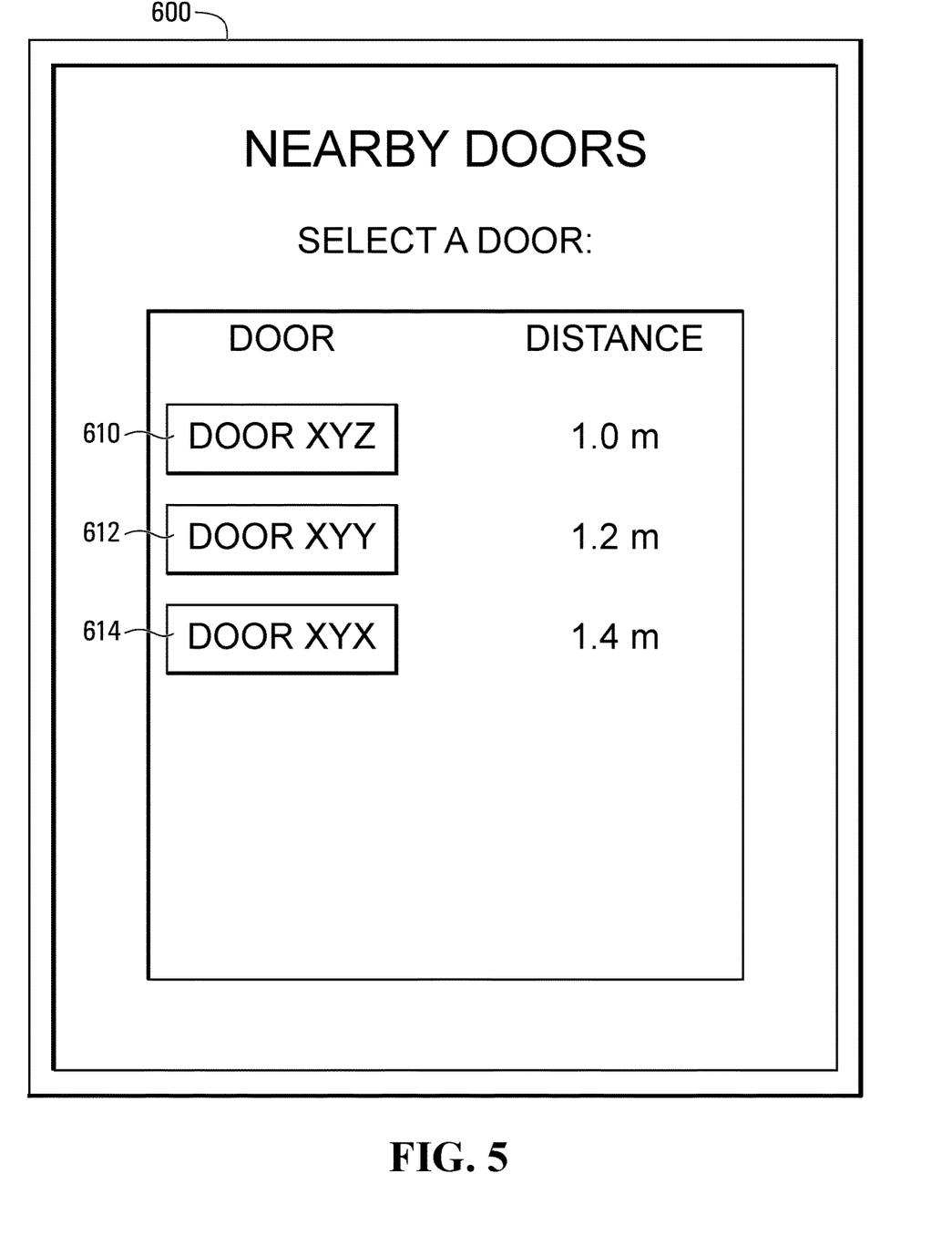
FIG. 5 illustrates another example user interface page for the access control application run on the mobile communications device of FIG. 2.

Referring to FIG. 5, within the example user interface page 600 there is displayed a number of selectable door icons 610, 612 and 614 (three in the illustrated example, noting that icons for other doors on the third floor are not shown because they may not be within Bluetooth™ communications range of the mobile communications device 266). The icons 610, 612 and 614 are displayed in a list-like manner and the security guard 260 can tap or click on any one of them to cause the respective identified door to be selected. As mentioned, door icons are displayed for nearby doors which, in some example embodiments, may be facilitated by software which processes the BLE beacons of the electronic locking/unlocking mechanisms 214 that are nearby. One example of this software is the Nearby APIs, which is a set of APIs developed by Google Inc. Google has also developed Eddystone™ which is an open Bluetooth™ 4.0 communication protocol. Eddystone™ supports multiple frame types for different use cases. For example, Eddystone-URL is a beacon frame type designed to convey compressed URLs. In accordance with at least one example embodiment the electronic locking/unlocking mechanisms 214 support broadcasting URLs as a part of the BLE beacons in Eddystone™ or some other suitable format.

Figure 6:
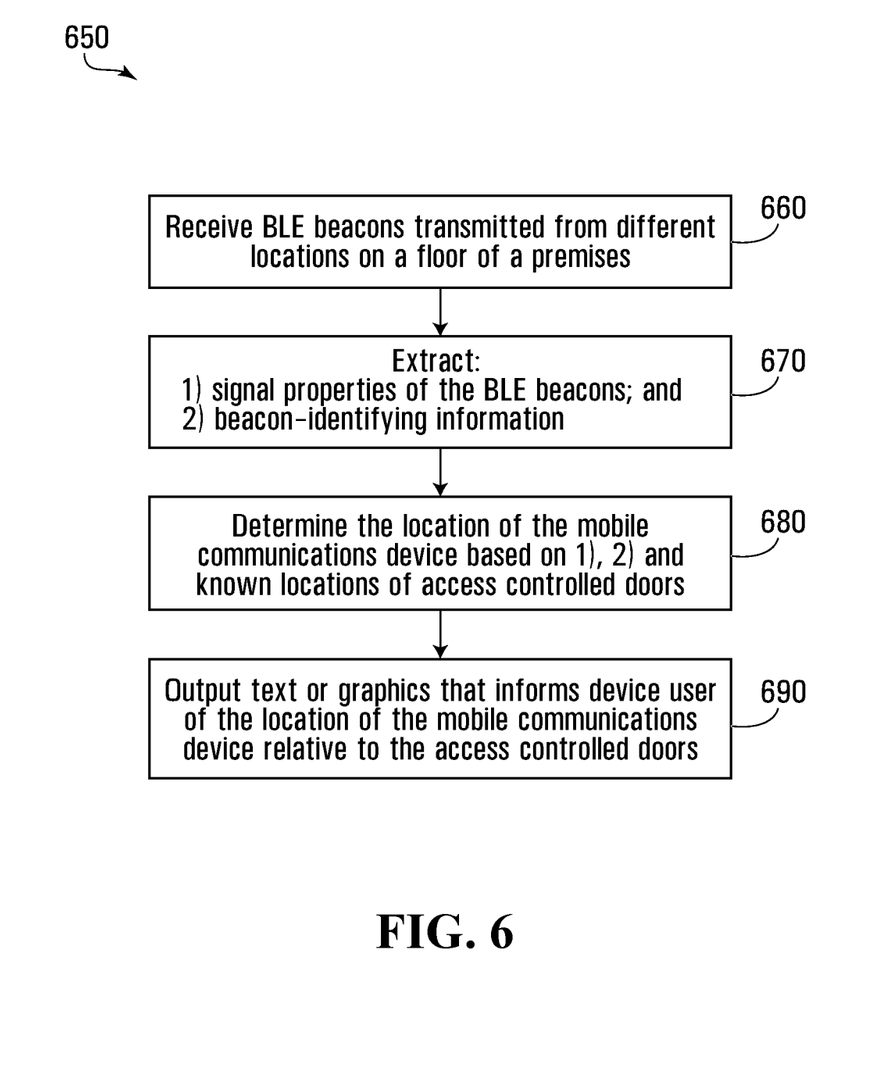
FIG. 6 is a flow chart illustrating a method carried out on a mobile communications device in accordance with some example embodiments.

Reference will now be made to FIG. 6. FIG. 6 is a flow chart illustrating a method 650 carried out on a mobile communications device in accordance with some example embodiments. The method 650 is consistent with example embodiments previously described in relation to the mobile communications device 266 such as, for example, those previously described in connection with FIGS. 4 and 5.

The illustrated method 650 includes, as a first action, receiving (660) BLE beacons transmitted from different locations on a floor of a premises. For example, two or more previously described electronic locking/unlocking mechanisms 214 on a same floor of the premises 200 may include respective BLE transmitters 490 that transmit the BLE beacons receivable by the mobile communications device 266.

Next the method 650 includes extracting (670) signal properties of the BLE beacons and beacon-identifying information (identified as "1)" and "2)" respectively in the flow chart of FIG. 6). The signal properties of the BLE beacons may be, for example, the RSSI of BLE beacons. The beacon-identifying information may be, for example, information that identifies a particular transmitter amongst the BLE transmitters 490 (this in turn identifies, for instance, the originating physical location of beacon transmission from amongst a plurality of potential known physical locations).

Next the method 650 includes determining (680) the location of the mobile communications device based on 1), 2) and the known locations of the access controlled doors. As previously discussed, techniques such as, for example, trilateration and weighted averages may be employed as part of the location determination.

Finally the method 650 includes outputting (690) the text or graphics that informs the device user of the location of the mobile communications device relative to the access controlled door. For example, within the user interface page 500 of FIG. 4 the graphical representation of the security guard 560 is meant to convey visual information to the security guard (device user) to show him where he is relative to the access controlled doors. As another example, within the user interface page 600 of FIG. 5 instead of graphics the text under "DISTANCE" informs the security guard (device user) of how far he is relative to the access controlled doors.

Figure 7:
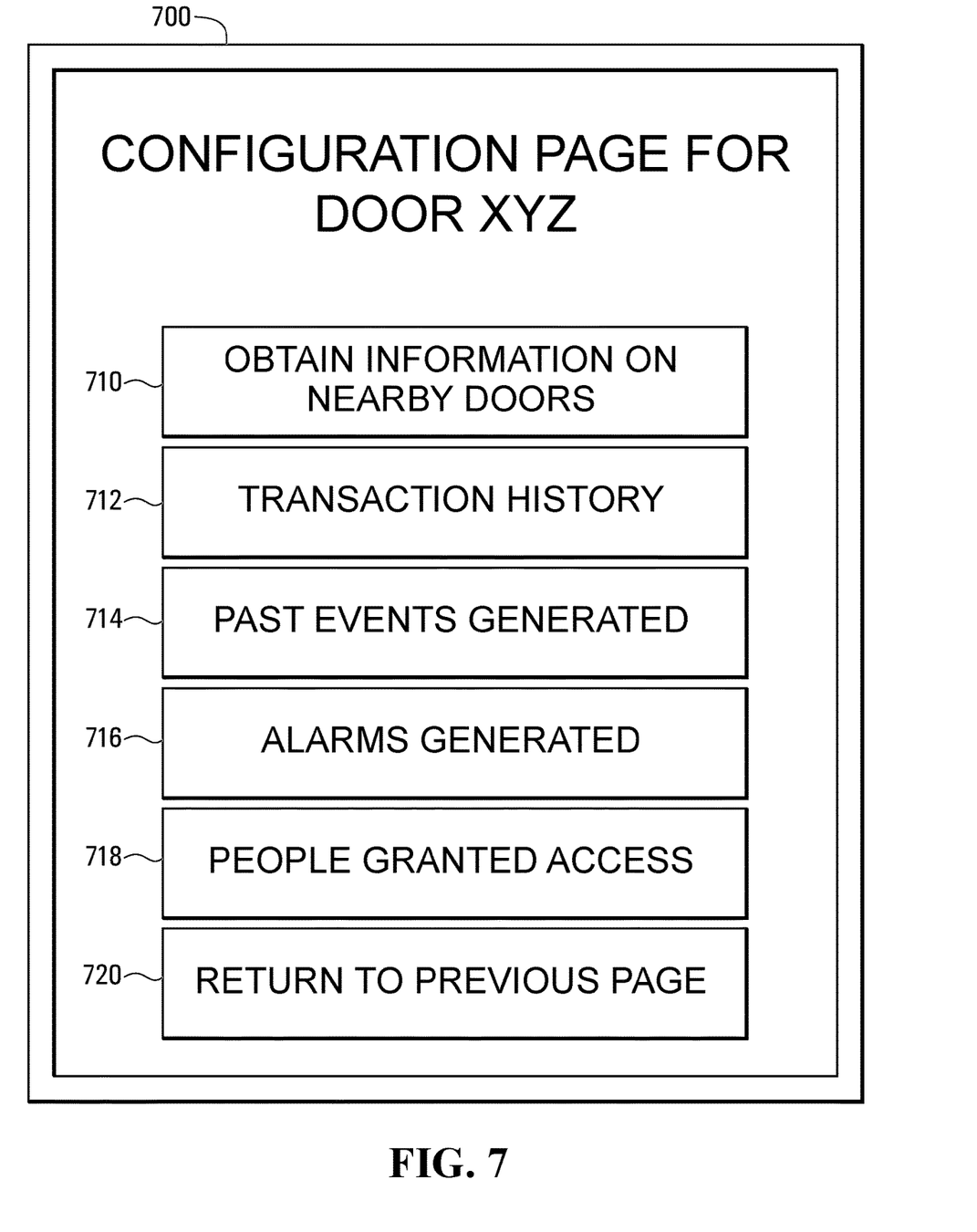
FIG. 7 illustrates another example user interface page for the access control application run on the mobile communications device of FIG. 2.

As mentioned, the security guard 260 can tap or click on any of the door icons 610, 612 and 614 within the user interface page 600. Now say for instance that the security guard 260 taps or clicks on the icon 610 labelled "DOOR XYZ". Referring to FIG. 7, a new user interface page 700 is generated. The user interface page 700 is a configuration page for door XYZ within which there is displayed a number of selectable icons. Icon 710 is for "Obtain Information on Nearby Doors". By selecting the icon 710 the security guard 260 can obtain information on nearby doors such as, for example, similar types of information as discussed below except a door nearby to XYZ instead of the door XYZ itself.

Icon 712 is for "Transaction History". By selecting the icon 712 the security guard 260 can obtain a history of transactions that occurred in relation to the door XYZ.

Icon 714 is for "Past Events Generated". By selecting the icon 714 the security guard 260 can obtain the details of past events generated in relation to the door XYZ.

Icon 716 is for "Alarms Generated". By selecting the icon 716 the security guard 260 can obtain the details of past alarms generated in relation to the door XYZ.

Icon 718 is for "People Granted Access". By selecting the icon 718 the security guard 260 can obtain the details of the people who were granted access to pass through the door XYZ.

Icon 720 is for "Return to Previous Page". By selecting the icon 720 the security guard 260 can change the device screen back to the user interface page 600 (or whatever was the previous user interface page displayed prior to the display of the user interface page 700.

Certain adaptations and modifications of the described embodiments can be made. Therefore, the above discussed embodiments are considered to be illustrative and not restrictive, and the invention should be construed as limited only by the appended claims.

The invention claimed is:

1. A method carried out on a mobile communications device, the method comprising:
   generating, on a display of the mobile communications device, a user interface page that provides a rendering of a floor map, the floor map including a plurality of access controlled doors icons in arranged graphical display so as to correspond to known locations of actual access controlled doors that the access controlled doors icons represent;
   receiving a plurality of wireless signals at the mobile communications device; and
   processing the wireless signals to obtain or derive information to enable calculation of a location of the mobile communications device relative to at least some of the known locations of the actual access controlled doors, and
   wherein the floor map includes a person icon positioned therein such that the calculated location is visually conveyed to a user of the mobile communications device.

2. The method as claimed in claim 1, wherein the wireless signals include a number of Bluetooth Low Energy beacons.

3. The method as claimed in claim 1, wherein the mobile communications device is a smart phone.

4. The method as claimed in claim 1, wherein all of the actual access controlled doors are on a common floor.

5. The method as claimed in claim 1, further comprising generating an indicator of an alert status.

6. The method as claimed in claim 5, wherein the alert status is specific to one of the actual access controlled doors.

7. The method as claimed in claim 6, wherein the indicator is a flashing indicator displayed proximate to one of the access controlled doors icons on the user interface page.

8. A mobile communications device capable of receiving a plurality of wireless signals, the mobile device comprising:
   a display;
   a microprocessor configured to execute instructions to carry out a method that includes:
      generating, on the display, a user interface page that provides a rendering of a floor map, the floor map including a plurality of access controlled doors icons in arranged graphical display so as to correspond to known locations of actual access controlled doors that the access controlled doors icons represent; and
      processing the wireless signals to obtain or derive information to enable calculation of a location of the mobile communications device relative to at least some of the known locations of the actual access controlled doors, and
      wherein the floor map includes a person icon positioned therein such that the calculated location is visually conveyed to a user of the mobile communications device.

9. The mobile communications device as claimed in claim 8, wherein the wireless signals include a number of Bluetooth Low Energy beacons.

10. The mobile communications device as claimed in claim 8, wherein the mobile communications device is a smart phone.

11. The mobile communications device as claimed in claim 8, wherein the method further includes generating an indicator of an alert status.

12. The mobile communications device as claimed in claim 11, wherein the alert status is specific to one of the actual access controlled doors.

13. The mobile communications device as claimed in claim 12, wherein the indicator is a flashing indicator that, when displayed, is proximate to one of the access controlled doors icons on the user interface page.

* * * * *